US011927082B2

(12) United States Patent
Yun et al.

(10) Patent No.: US 11,927,082 B2
(45) Date of Patent: Mar. 12, 2024

(54) NON-METALLIC COMPLIANT SAND CONTROL SCREEN

(71) Applicant: Schlumberger Technology Corporation, Sugar Land, TX (US)

(72) Inventors: Jushik Yun, Sugar Land, TX (US); Rasika Prabhu, Houston, TX (US); Valerie Gisele Helene Lafitte, Sugar Land, TX (US); Julien Debard, Houston, TX (US); Balkrishna Gadiyar, Katy, TX (US); Mehmet Parlar, Sugar Land, TX (US); Camilo Eduardo Zuniga Jurgensen, Katy, TX (US); Chidi Eugene Nwafor, Luanda (AO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 348 days.

(21) Appl. No.: 17/310,667

(22) PCT Filed: Feb. 17, 2020

(86) PCT No.: PCT/US2020/018495
§ 371 (c)(1),
(2) Date: Aug. 17, 2021

(87) PCT Pub. No.: WO2020/172092
PCT Pub. Date: Aug. 27, 2020

(65) Prior Publication Data
US 2022/0127934 A1 Apr. 28, 2022

Related U.S. Application Data
(60) Provisional application No. 62/808,132, filed on Feb. 20, 2019.

(51) Int. Cl.
*E21B 43/10* (2006.01)
*C09K 8/588* (2006.01)
*E21B 43/08* (2006.01)

(52) U.S. Cl.
CPC ............ *E21B 43/108* (2013.01); *C09K 8/588* (2013.01); *E21B 43/082* (2013.01)

(58) Field of Classification Search
CPC ...... E21B 43/082; E21B 43/108; C09K 8/588
See application file for complete search history.

(56) References Cited

U.S. PATENT DOCUMENTS 2,981,332 A 4/1961 Miller
2,981,333 A 4/1961 Miller et al.
(Continued)

FOREIGN PATENT DOCUMENTS

CA 2969518 A1 6/2016
CN 2343338 Y 10/1999
(Continued)

OTHER PUBLICATIONS

International Search Report and Written Opinion issued in the PCT Application PCT/US2020/018495, dated Jun. 12, 2020 (15 pages).
(Continued)

*Primary Examiner* — D. Andrews
*Assistant Examiner* — Ronald R Runyan
(74) *Attorney, Agent, or Firm* — Jeffrey D. Frantz

(57) ABSTRACT

A sand screen apparatus for use in a downhole operation for hydrocarbon recovery includes a non-metallic material and a mechanical retainer. The non-metallic material has a compressed state and an expanded state, and includes a base polymer, and one or a plurality of smart fillers dispersed with a polymeric matrix of the non-metallic material. The mechanical retainer compresses the non-metallic material in the compressed state. The one or the plurality of smart fillers
(Continued)

react with the base polymer in the expanded state after exposure to a wellbore condition.

20 Claims, 14 Drawing Sheets

(56) References Cited

U.S. PATENT DOCUMENTS

| | | |
|---|---|---|
| 3,099,318 A | 7/1963 | Miller |
| 3,712,373 A | 1/1973 | Bearden et al. |
| 3,816,894 A | 6/1974 | Howard et al. |
| 3,901,320 A | 8/1975 | Calderon et al. |
| 4,917,183 A | 4/1990 | Gaidry et al. |
| 5,310,000 A | 5/1994 | Arterbury et al. |
| 5,782,299 A | 7/1998 | Simone et al. |
| 5,913,365 A | 6/1999 | Bryant |
| 6,216,788 B1 | 4/2001 | Wilson |
| 6,543,545 B1 | 4/2003 | Chatterji et al. |
| 6,607,032 B2 | 8/2003 | Voll et al. |
| 6,695,054 B2 | 2/2004 | Johnson et al. |
| 6,766,862 B2 | 7/2004 | Chatterji et al. |
| 6,841,582 B2 | 1/2005 | Morikawa et al. |
| 6,935,432 B2 | 8/2005 | Nguyen |
| 7,013,979 B2 | 3/2006 | Richard |
| 7,048,048 B2 | 5/2006 | Nguyen et al. |
| 7,168,485 B2 | 1/2007 | Johnson et al. |
| 7,258,166 B2 | 8/2007 | Russell |
| 7,318,481 B2 | 1/2008 | Richard |
| 7,373,991 B2 | 5/2008 | Vaidya et al. |
| 7,493,947 B2 | 2/2009 | Ross |
| 7,581,586 B2 | 9/2009 | Russell |
| 7,644,773 B2 | 1/2010 | Richard |
| 7,665,538 B2 | 2/2010 | Robisson et al. |
| 7,703,520 B2 | 4/2010 | Dusterhoft |
| 7,743,835 B2 | 6/2010 | Willauer |
| 7,814,973 B2 | 10/2010 | Dusterhoft et al. |
| 7,828,055 B2 | 11/2010 | Willauer et al. |
| 7,832,490 B2 | 11/2010 | Willauer |
| 7,841,409 B2 | 11/2010 | Gano et al. |
| 7,861,787 B2 | 1/2011 | Russell |
| 7,866,383 B2 | 1/2011 | Dusterhoft et al. |
| 7,926,565 B2 | 4/2011 | Duan et al. |
| 7,967,596 B2 | 6/2011 | Livi |
| 7,984,760 B2 | 7/2011 | Haeberle et al. |
| 8,048,348 B2 | 11/2011 | Duan et al. |
| 8,127,831 B2 | 3/2012 | Haeberle et al. |
| 8,196,653 B2 | 6/2012 | Fripp et al. |
| 8,245,778 B2 | 8/2012 | Yeh et al. |
| 8,256,510 B2 | 9/2012 | Holderman et al. |
| 8,291,972 B2 | 10/2012 | Dusterhoft et al. |
| 8,302,681 B2 | 11/2012 | Fripp et al. |
| 8,316,952 B2 | 11/2012 | Moen |
| 8,365,833 B2 | 2/2013 | Carrejo et al. |
| 8,490,707 B2 | 7/2013 | Robisson et al. |
| 8,499,827 B2 | 8/2013 | Dusterhoft et al. |
| 8,511,361 B2 | 8/2013 | Guest |
| 8,517,184 B2 | 8/2013 | Carrejo et al. |
| 8,528,640 B2 | 9/2013 | Agrawal |
| 8,540,032 B2 | 9/2013 | Nutley et al. |
| 8,551,274 B2 | 10/2013 | Guest |
| 8,579,025 B2 | 11/2013 | Holderman et al. |
| 8,651,179 B2 | 2/2014 | Vaidya et al. |
| 8,664,318 B2 | 3/2014 | Guest et al. |
| 8,678,100 B2 | 3/2014 | Guest et al. |
| 8,684,075 B2 | 4/2014 | Guest et al. |
| 8,701,757 B2 | 4/2014 | Greci |
| 8,720,590 B2 | 5/2014 | Guest et al. |
| 8,721,958 B2 | 5/2014 | Guest |
| 8,783,349 B2 | 7/2014 | Robisson et al. |
| 8,850,706 B2 | 10/2014 | Bonner et al. |
| 8,875,784 B2 | 11/2014 | Kuo et al. |
| 8,876,944 B2 | 11/2014 | Ren et al. |
| 8,939,222 B2 | 1/2015 | Ren et al. |
| 8,980,799 B2 | 3/2015 | Agrawal et al. |
| 9,044,914 B2 | 6/2015 | Guest et al. |
| 9,051,805 B2 | 6/2015 | Johnson et al. |
| 9,068,437 B2 | 6/2015 | Carrejo et al. |
| 9,090,012 B2 | 7/2015 | Mazyar et al. |
| 9,155,983 B2 | 10/2015 | Guest et al. |
| 9,174,151 B2 | 11/2015 | Lopez et al. |
| 9,212,541 B2 | 12/2015 | Richard et al. |
| 9,243,473 B2 | 1/2016 | Yang et al. |
| 9,322,249 B2 | 4/2016 | Fripp et al. |
| 9,388,671 B2 | 7/2016 | Holderman |
| 9,399,902 B2 | 7/2016 | Greci |
| 9,434,026 B2 | 9/2016 | Koli et al. |
| 9,441,458 B2 | 9/2016 | Carrejo et al. |
| 9,441,462 B2 | 9/2016 | Chakraborty et al. |
| 9,725,988 B2 | 8/2017 | Gano et al. |
| 9,777,548 B2 | 10/2017 | Prieto et al. |
| 9,878,486 B2 | 1/2018 | Liu et al. |
| 10,072,482 B2 | 9/2018 | Hodge et al. |
| 10,107,093 B2 | 10/2018 | Yeh et al. |
| 10,184,323 B2 | 1/2019 | Kim et al. |
| 10,435,554 B2 | 10/2019 | Yun et al. |
| 10,443,339 B2 | 10/2019 | Yun et al. |
| 10,450,844 B2 | 10/2019 | Kim et al. |
| 10,487,630 B2 | 11/2019 | Davis et al. |
| 10,508,185 B2 | 12/2019 | Murugesan et al. |
| 10,577,896 B2 | 3/2020 | Dowsett et al. |
| 10,767,449 B2 | 9/2020 | Lazo et al. |
| 10,781,672 B2 | 9/2020 | Lazo et al. |
| 10,781,673 B2 | 9/2020 | Kim et al. |
| 10,781,674 B2 | 9/2020 | Bourgneuf et al. |
| 11,060,382 B2 | 7/2021 | Sherman |
| 2003/0089495 A1 | 5/2003 | Bixenman |
| 2004/0261994 A1 | 12/2004 | Nguyen et al. |
| 2005/0034860 A1 | 2/2005 | Lauritzen |
| 2005/0056425 A1 | 3/2005 | Grigsby et al. |
| 2006/0175065 A1 | 8/2006 | Ross |
| 2006/0185849 A1 | 8/2006 | Edwards et al. |
| 2007/0012444 A1 | 1/2007 | Horgan et al. |
| 2008/0035330 A1 | 2/2008 | Richards |
| 2008/0083493 A1 | 4/2008 | Ridges et al. |
| 2008/0217002 A1 | 9/2008 | Simonds et al. |
| 2008/0264647 A1 | 10/2008 | Li |
| 2009/0151942 A1 | 6/2009 | Bernardi, Jr. |
| 2009/0173497 A1 | 7/2009 | Dusterhoft |
| 2010/0069469 A1 | 3/2010 | Young et al. |
| 2010/0252254 A1 | 10/2010 | Nutley et al. |
| 2010/0258302 A1 | 10/2010 | Bonner et al. |
| 2011/0086942 A1 | 4/2011 | Robisson et al. |
| 2011/0098202 A1 | 4/2011 | James et al. |
| 2011/0232901 A1 | 9/2011 | Carrejo et al. |
| 2011/0247813 A1 | 10/2011 | Moen |
| 2011/0303411 A1 | 12/2011 | Todd et al. |
| 2012/0017134 A1 | 1/2012 | Lee et al. |
| 2012/0211226 A1 | 8/2012 | Guest et al. |
| 2013/0032969 A1 | 2/2013 | Guest et al. |
| 2013/0092394 A1 | 4/2013 | Holderman et al. |
| 2013/0161026 A1 | 6/2013 | Garza et al. |
| 2014/0020910 A1 | 1/2014 | Falkner et al. |
| 2014/0332220 A1 | 11/2014 | Garza et al. |
| 2016/0115759 A1 | 4/2016 | Richards et al. |
| 2017/0114621 A1 | 4/2017 | Holderman et al. |
| 2017/0254170 A1 | 9/2017 | Mazyar et al. |
| 2017/0362922 A1 | 12/2017 | Lazo et al. |
| 2018/0119526 A1 | 5/2018 | Lopez et al. |
| 2019/0023979 A1 | 1/2019 | Crews et al. |
| 2020/0408073 A1 | 12/2020 | Weirich et al. |
| 2022/0003081 A1 | 1/2022 | Kovalchuk |
| 2022/0003083 A1 | 1/2022 | Sadana et al. |
| 2022/0003084 A1 | 1/2022 | Kovalchuk et al. |

FOREIGN PATENT DOCUMENTS

| | | |
|---|---|---|
| CN | 2903364 Y | 5/2007 |
| CN | 201794569 U | 4/2011 |
| CN | 103620158 A | 3/2014 |
| CN | 203476296 U | 3/2014 |
| CN | 204267001 U | 4/2015 |
| CN | 108086963 A | 5/2018 |
| CN | 111499966 A | 8/2020 |
| CN | 211201905 U | 8/2020 |

(56) References Cited

FOREIGN PATENT DOCUMENTS

| | | | |
|---|---|---|---|
| CN | 112459750 A | 3/2021 |
| CN | 213450304 U | 6/2021 |
| CN | 114412422 A | 4/2022 |
| CN | 114542042 A | 5/2022 |
| CN | 217421130 U | 9/2022 |
| EA | 009070 B1 | 10/2007 |
| EP | 1162055 B1 | 4/2004 |
| EP | 2334899 B1 | 6/2011 |
| EP | 2480752 B1 | 8/2012 |
| EP | 2561179 B1 | 2/2013 |
| GB | 2421527 A | 6/2006 |
| RU | 2559973 C1 | 8/2015 |
| WO | 2009045656 A1 | 4/2009 |
| WO | 2012166234 A1 | 12/2012 |
| WO | 2015041819 A1 | 3/2015 |
| WO | 2015056260 A1 | 4/2015 |
| WO | 2016032621 A1 | 3/2016 |
| WO | 2016137439 A1 | 9/2016 |
| WO | 2017155868 A1 | 9/2017 |
| WO | 2019055166 A1 | 3/2019 |
| WO | 2019083461 A1 | 5/2019 |
| WO | 2020068409 A1 | 4/2020 |
| WO | 2020172092 A1 | 8/2020 |
| WO | 2021203799 A1 | 10/2021 |
| WO | 2022081440 A1 | 4/2022 |

OTHER PUBLICATIONS

Carrejo, et al., "The Effects of Dynamic Loading on the Sand Management and Permeability of Shape Memory Polymer and Gravel Packs for Sand Management Applications", SPE 143060—Brasil Offshore, Macae, Brazil, Jun. 14-17, 2011, 9 pages.

Crossland, et al., "A Bicontinuous Double Gyroid Hybrid Solar Cell", Nano Letters, vol. 9 {8}, 2009, pp. 2807-2812.

Wang, et al., "Co-Continuous Composite Materials for Stiffness, Strength, and Energy Dissipation", Advanced Materials, vol. 23 (13), Apr. 5, 2011, pp. 1524-1529.

Wei, et al., "Review shape memory materials and hybrid composites for smart systems", J. Mater. Sci., vol. 33, 1998, pp. 3763-3783.

Yuan, et al., "In-Situ Mechanical and Functional Behavior of Shape Memory Polymer Materials for Sand Management Applications", SPE 143204—Brasil Offshore, Macae, Brazil, Jun. 14-17, 2011, 10 pages.

Zalusky, et al., "Ordered Nanoporous Polymers from Polystyrene-Polylactide Block Copolymers", J. Am. Chem. Soc., vol. 124 (43), 2002, pp. 12761-12773.

International Search Report and Written Opinion issued in PCT/US2013/036100 dated Jul. 10, 2013, 13 pages.

Gibson, et al., "Cellular Solids: Structure & Properties", Pergamon Press, Oxford, 1988, pp. 183.

Van Krevelen et al., "Properties of Polymers", 4th Edition, Elsevier B.V., New York, 2009, pp. 611.

Anonymous, "GeoFORM Conformable Sand Management System Improve reliability through total conformance," Baker Hughes Incorporated, Brochure, 2011: 1-4.

Gibson et al., "(a) Linear elasticity," Cellular solids Structure and properties—Second Edition, Cambridge University Press: New York, 1999: p. 183.

International Search Report and Written Opinion issued in the PCT Application PCT/US2023/010451 dated Apr. 27, 2023, 10 pages.

ASTM D1418—Standard Practice for Rubber and Rubber Latices—Nomenclature, originally approved in 1956 (3 pages).

International Search Report and Written Opinion issued in the PCT Application PCT/US2021/054334 dated Jan. 26, 2022 (11 pages).

International Preliminary Report on Patentability issued in PCT Application PCT/US2020/018495, dated Sep. 2, 2021 (10 pages).

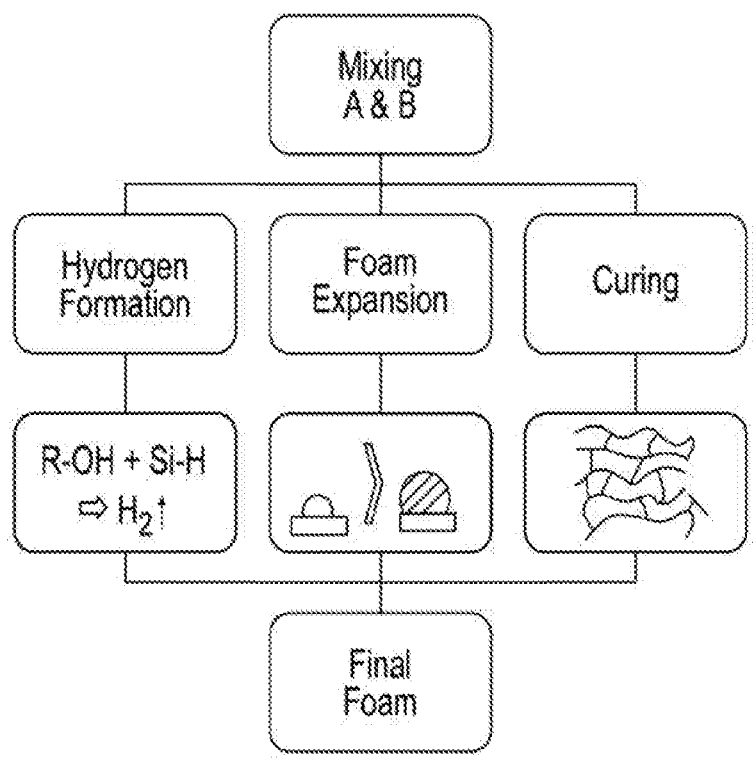
FIG. 14
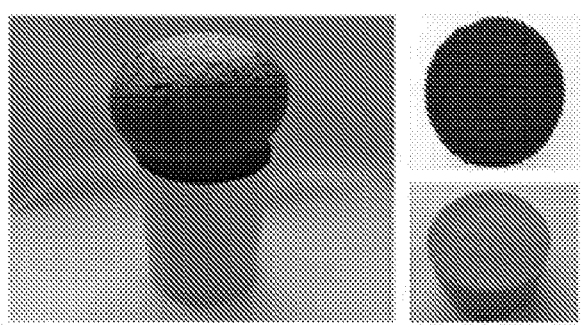
FIG. 15
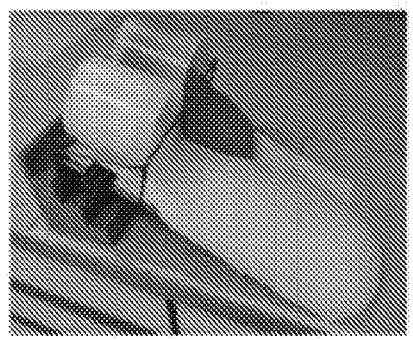

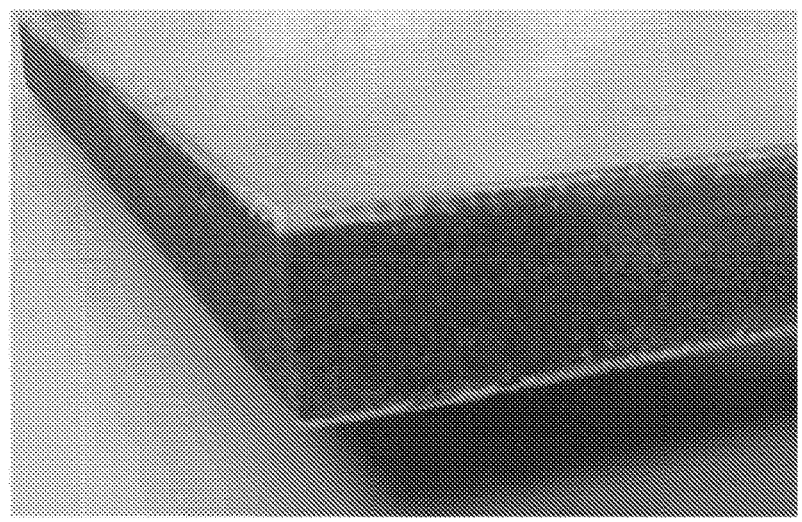
FIG. 16
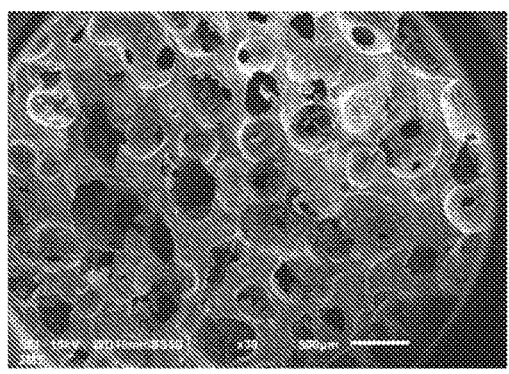 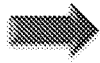 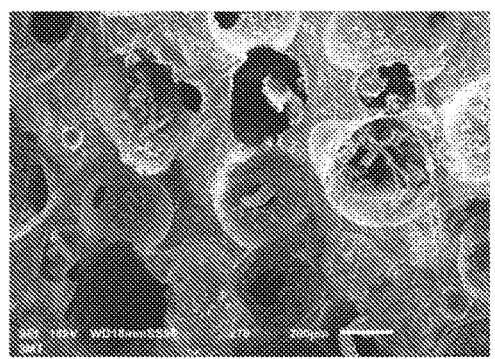
FIG. 17(A)          FIG. 17(B)

NON-METALLIC COMPLIANT SAND CONTROL SCREEN

CROSS-REFERENCE TO RELATED APPLICATION

This application is a National Stage Entry of International Application No. PCT/US2020/018495, filed Feb. 17, 2020, which is based on and claims priority to U.S. Provisional Patent Application No. 62/808,132, filed Feb. 20, 2019, which is incorporated by reference in its entirety.

BACKGROUND

In many hydrocarbon wells, inflowing fluid passes through a sand screen which filters out particulates from the inflowing oil or gas. The sand screen prevents sand from entering the wellbore and reduces damage that may occur by erosion. Conventionally, sand screens are made with a metallic mesh material. Once the sand screen is placed into the wellbore, gravel packs are pumped to fill the annulus between the screen and the formation.

In other instances, some metallic sand screens are expandable and are expanded downhole after placement in the wellbore. The result is a reduction in the annulus between the screen and the formation. The expandable screens in many instances have a limited expansion ratio and the ability of the expandable screen to conform to borehole irregularities may not be satisfactory. Further, the ability of the expandable sand screen to resist borehole collapse may be reduced. Conventional sand screens are rated to resist greater external pressure than expandable sand screens. Expandable sand screens resist less external pressure because of plastic deformation experienced by their metallic components.

Recently, self-conformable polymer screens have been developed by using thermoplastic urethane (TPU) and implementing a shape memory concept. The polymeric screen has an open cell structure, which has been compressed. The polymeric screen is then placed into a wellbore and expanded by controlling the glass transition temperature of the polymeric material by utilizing an activation fluid, such as acetyl acetone, for example. The activation fluid is difficult to handle at the well site because the flash point of the activation fluid is relatively low, and a special formulation of the fluid is required. Once in the borehole, the polymeric TPU foam material softens and tries to return to its original expanded shape. The expansion outer diameter was designed to be higher than the borehole internal diameter, resulting in the TPU foam conforming to the entire length of an even irregularly shaped, e.g., open hole, borehole, which can circumvent the need to pump gravel slurry in a gravel packing operation. However, one of the disadvantages of the foam material used in these sand screens is the weak mechanical properties of these foams when expanded. The application is limited by the pressure and temperature rating. If an expanded foam fails during a downhole operation, well control may be lost. Further, screen collapse under wellbore pressure may lead to a loss of permeability and a stuck completion string in the wellbore, which may be difficult to repair or change.

SUMMARY

In one or more embodiments of the present disclosure, a sand screen apparatus for use in a downhole operation for hydrocarbon recovery includes a non-metallic material having a compressed state and an expanded state, the non-metallic material including a base polymer, and one or a plurality of smart fillers dispersed within a polymeric matrix of the non-metallic material, and a mechanical retainer that compresses the non-metallic material in the compressed state. In one or more embodiments of the present disclosure, the one or the plurality of smart fillers react with the base polymer in the expanded state after exposure to a wellbore condition.

A well completion method according to one or more embodiments of the present disclosure includes covering at least one base pipe with a non-metallic material comprising a base polymer and one or a plurality of smart fillers, compressing the non-metallic material with a mechanical retainer, running the base pipe to a location in a wellbore, expanding the non-metallic material, conforming the non-metallic material to a wall of the wellbore, stiffening the non-metallic material, filtering fluids through the non-metallic material to the base pipe, detaching the non-metallic material from the base pipe, and lifting the base pipe out of the wellbore.

A method of completing a wellbore in a subterranean formation according to one or more embodiments of the present disclosure includes positioning an expandable sand control apparatus in the wellbore and forming an annulus between the sand control apparatus and the wellbore, the sand control apparatus having a cellular open cell structure with a non-metallic material including a base polymer, and one or a plurality of smart fillers, the non-metallic material configured to expand and fill the annulus.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIG. 14 shows an example of a silicone foam process according to one or more embodiments of the present disclosure;

FIG. 15 shows an example of a silicone foam according to one or more embodiments of the present disclosure;

FIG. 16 shows an example of an epoxy foam according to one or more embodiments of the present disclosure;

FIGS. 17(A) and 17(B) show an epoxy foam morphology at 500 µm resolution and 200 µm resolution, respectively.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

In the specification and appended claims: the terms "up" and "down," "upper" and "lower," "upwardly" and "downwardly," "upstream" and "downstream," "uphole" and "downhole," "above" and "below," and other like terms indicating relative positions above or below a given point or element are used in this description to more clearly describe some embodiments of the disclosure.

The present disclosure generally relates to using a non-metallic material with smart fillers for sand control applications. Using smart fillers allows the non-metallic materials to self-expand to conform to the irregular shape of the wellbore. The non-metallic materials are easy to manufacture by compounding and injection molding. Without the need for additional activation fluids, the non-metallic materials according to one or more embodiments of the present disclosure are much safer over conventional TPU materials. The non-metallic materials according to one or more embodiments of the present disclosure also provide excellent thermal stability allowing them to be used at much higher temperatures, up to 150° C. for example, for long-term applications. In contrast, conventional TPU materials are only operable up to 85° C.

Figure 1:
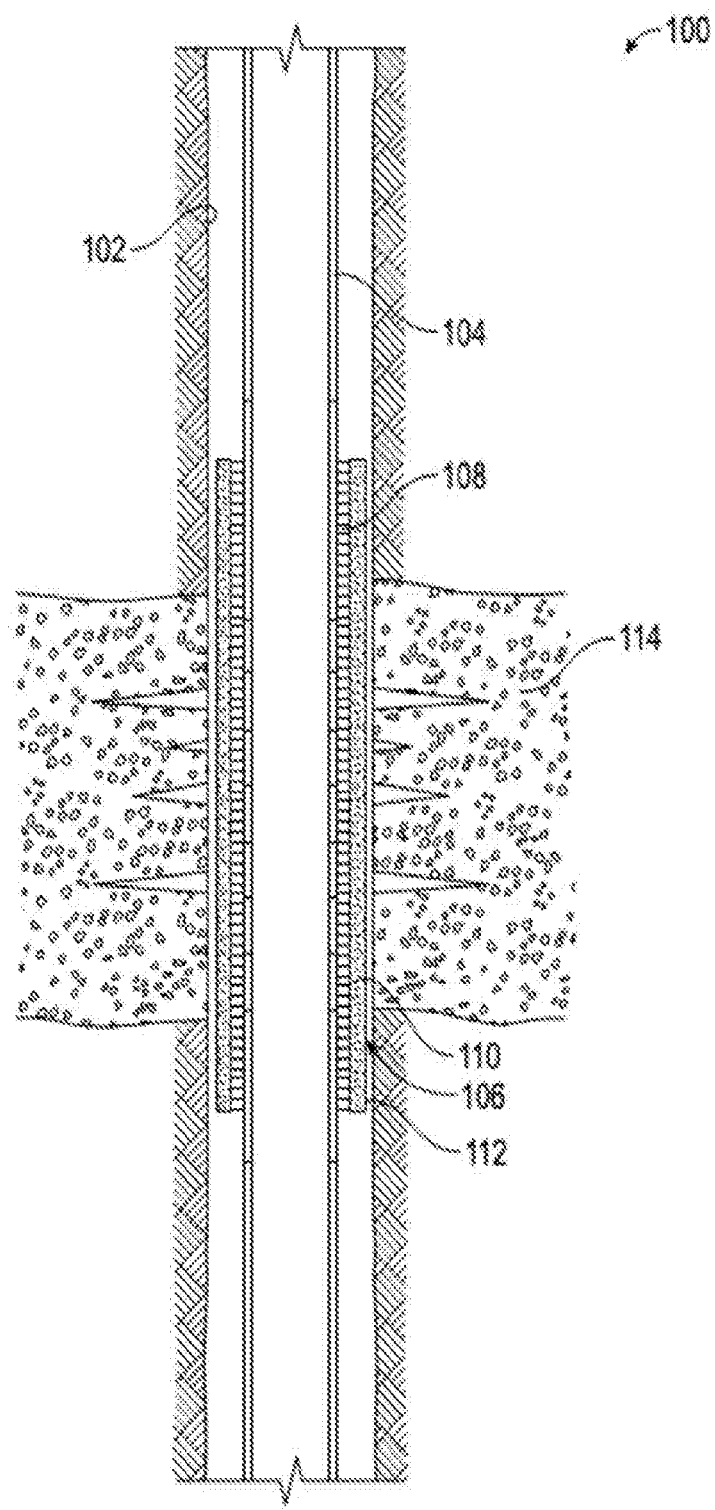
FIG. 1 is a sectional view of a sand screen positioned in a wellbore according to one or more embodiments of the present disclosure.

Referring now to FIG. 1, a sectional view of a sand screen positioned in a wellbore according to one or more embodiments of the present disclosure is shown. Specifically, the wellbore 100 includes an open bore hole 102, a production tubing string 104, which may be a base pipe according to one or more embodiments, and a sand screen 106. While wellbore 100 is illustrated as being a substantially vertical, uncased well, it should be recognized that the subject disclosure is equally applicable for use in cased wellbores as well as in horizontal and/or inclined wellbores. The sand screen 106 includes a filter member 108 and a compliant material 112. The sand screen 106 is shown positioned in the wellbore 100 adjacent a producing formation 114. According to one or more embodiments of the present disclosure, the compliant material 112 may be the only filtration agent without the use of any filter member 108. The compliant material 112 may be a porous material and therefore acts as a filtration agent. In one or more embodiments, the filter member 108 can be configured for structural support of the compliant material 112.

If it becomes necessary to remove the tubing 104 and the filter member 108 for some reason, (e.g., work over the well to restore production), the tubing 104 and the filter member 108 may be pulled out of the wellbore 100. The compliant material 112 may be attached to the filter member 108 or the tubing 104 via an attachment 110. In some embodiments, the attachment 110 may include a material that may degrade with exposure to downhole temperatures, fluids or time, e.g., a glue, or a degradable layer or film. In other embodiments, the compliant material 112 may be attached to the filter member 108 or the tubing 104 with an attachment 110 that is time-invariant. In a non-limiting example, this may involve shear screws, which would shear at a given force and release the attachment 110. Degradation of the material may be important in situations when the run-in forces are greater than that available during fishing. If the run-in forces are less than that available during fishing, degradation is not necessary. In certain situations where the compliant material 112 is not detached from the filter member 108 or from the tubing 104, there may be multiple "flexible screens" comprising the compliant material, which results in the axial pull being divided. In these situations, a provision is made for a weak plane below each "flexible screen" so that the tubing below each "flexible screen" is parted, and each "flexible screen" may be removed sequentially.

Still referring to FIG. 1, in a well completion method according to one or more embodiments of the present disclosure, at least one base pipe 104 may be covered with a compliant material 112, which may be a non-metallic compliant material that includes a base polymer and one or more smart fillers, as further described below. The compliant material 112 covering the base pipe 104 may be compressed with a mechanical retainer before running the base pipe 104 to a location in the wellbore 100, as further described below. Upon exposure to a condition in the wellbore 100, the compliant material 112 covering the base pipe 104 may expand due to reaction of the one or more smart fillers, and release or degradation of the mechanical retainer, as further described below. In one or more embodiments, the smart fillers stiffen the compliant material 112 during expansion. As the compliant material 112 expands into and fills the annulus, the compliant material 112 conforms to a wall of the wellbore 100. Because the compliant material 112 is able to conform to the wellbore 100 wall in this way, the compliant material 112 is able to filter debris including sand from fluids from the producing formation 114 to the base pipe 104. After the downhole operation is complete, the compliant material 112 may be detached from the base pipe 104, and the base pipe 104 may be lifted out of the wellbore 100.

Figure 2A:
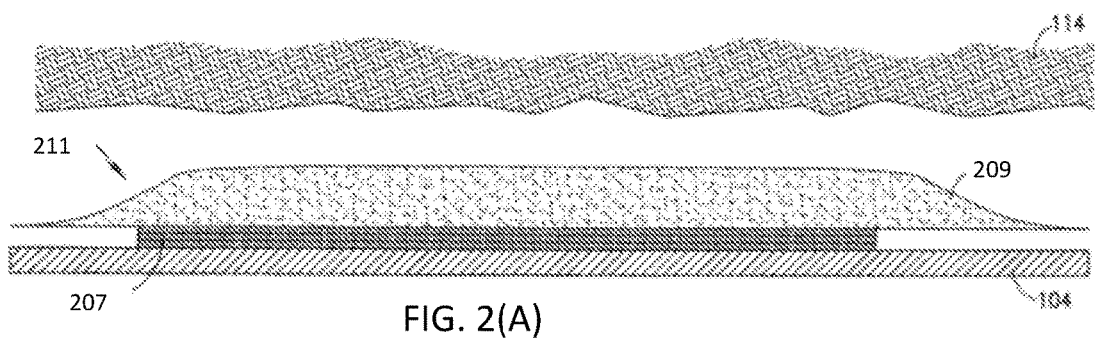
FIGS. 2(A) and 2(B) show further details of the sand screen according to one or more embodiments of the present disclosure.
Figure 2B:
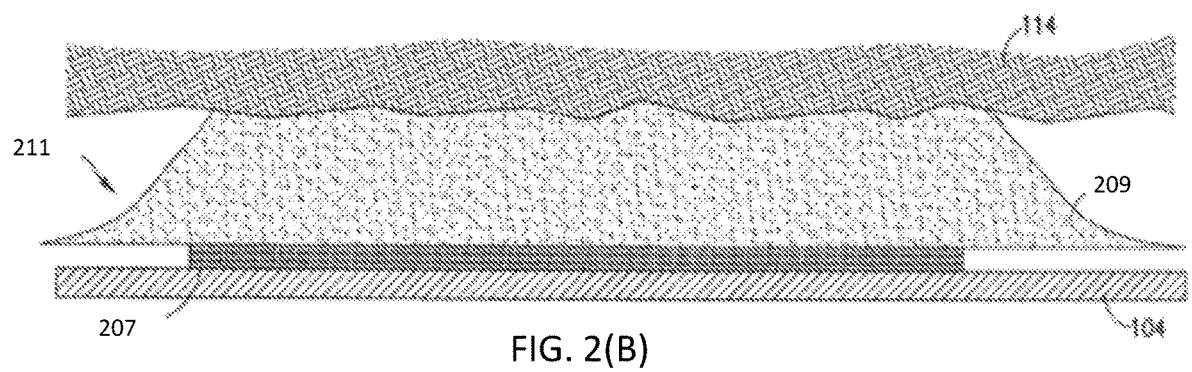

FIGS. 2(A) and 2(B) show further details of the non-metallic compliant screen, according to one or more embodiments of the present disclosure. FIGS. 2(A) and 2(B) show a compliant screen 211, which comprises a non-metallic compliant material 209 and a filter material or screen 207, which may be constructed in a variety of configurations, e.g., a slotted liner. FIG. 2(A) shows the compliant screen 211 in its initial, unexpanded state, and FIG. 2(B) shows the compliant screen 211 in its expanded state. The compliant screen 211 is initially compliant, and according to one or more embodiments, the non-metallic compliant material 209 of the compliant screen 211 includes a base polymer and one or more smart fillers that facilitate swelling and/or reinforcement of the non-metallic compliant material 209 upon reaction with the base polymer.

Figure 3:
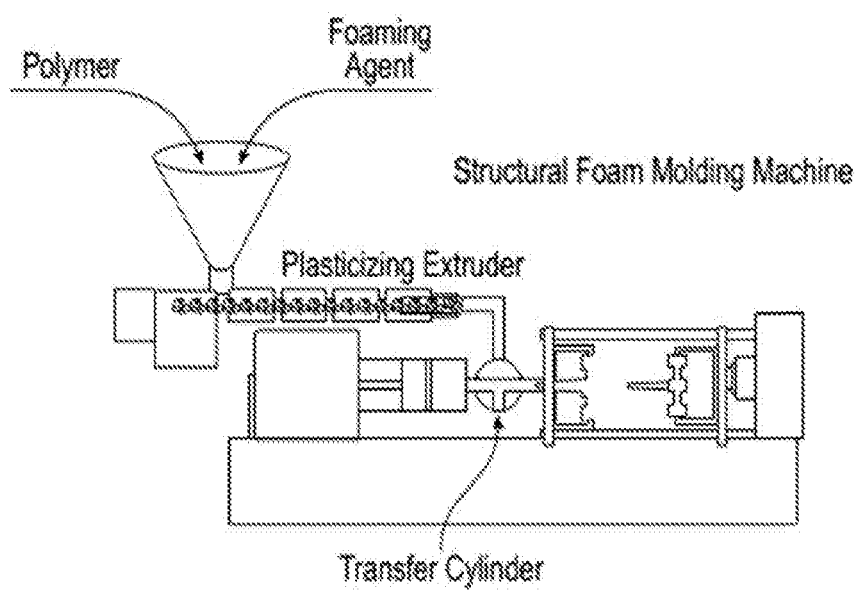
FIG. 3 shows a schematic drawing of a chemical foaming process according to one or more embodiments of the present disclosure.
Figure 4:
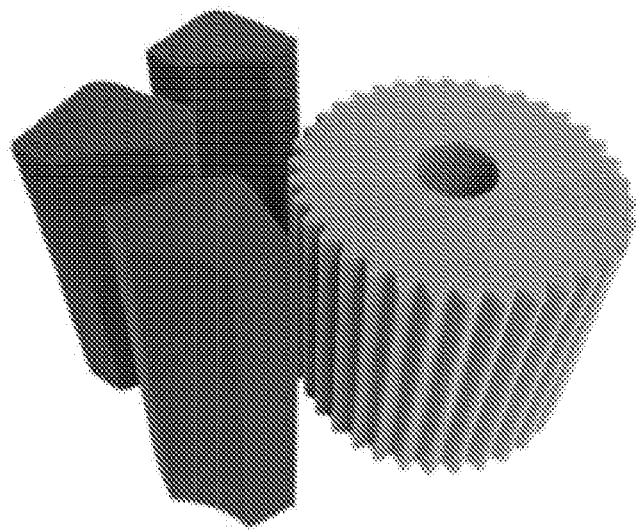
FIG. 4 shows an example of an open cell foam according to one or more embodiments of the present disclosure.

Referring now to FIG. 3, a schematic drawing of a chemical foaming process using a structural foam molding machine is shown, in accordance with one or more embodiments of the present disclosure. In the foaming process according to one or more embodiments of the present disclosure, a polymer open cell structure can be manufactured by utilizing various chemical foaming agents during a molding process. Polymer materials according to one or more embodiments of the present disclosure may be prepared by being compounded with smart fillers, which may include swellable or reinforcing fillers, and/or foaming agents. In this way, the polymer materials can be manufactured with a chemical foaming agent to create open cell structures, such as the open cell foam shown in FIG. 4, for example. Using this chemical foaming process, the non-metallic compliant material according to one or more embodiments of the present disclosure may assume a foam structure, which may be a microfoam structure. Advantageously, the foam structure can allow production fluid to pass through, while blocking solid debris from the wellbore, such as sands.

Chemical foaming agents are chemical substances that decompose during heating, and the resulting gaseous decomposition products are dispersed through polymer melts. To obtain a uniform cell structure, the gas is either injected or evolved by heat and must be thoroughly dispersed in the polymer melts. Some of the essential factors influencing this process are the particle size of the foaming agent, the dispersive properties of the machine, the decomposition rate of the foaming agent, and the melt viscosity of the thermoplastic resin being processed. In one or more embodiments of the present disclosure, $CO_2$, $N_2$, and hydrofluorocarbons (HFCs) may be used as the chemical foaming agents, for example.

As previously described, the non-metallic compliant material for the compliant screen may include a base polymer and one or more smart fillers. According to one or more embodiments of the present disclosure, the base polymer may include at least one of polyurethane, thermoplastic polyurethane, thermoplastic elastomer, poly ether-ester block copolymer, polyamide polyether thermoplastic elastomer, polyolefin, cross-linked polyethylene, silicone rubber, nitrile butadiene rubber (NBR), hydrogenated nitrile butadiene rubber (HNBR), ethylene propylene diene monomer rubber (EPDM), any type of fluoroelastomer, epoxy, and polyimide, for example.

Also, according to one or more embodiments of the present disclosure, the one or more smart fillers may include at least one of a swellable filler and/or a reinforcing filler. For example, the smart fillers may include at least one swellable filler such as superabsorbent polymers (SAP), ethylene propylene diene monomer rubber (EPDM), and hydrogenated nitrile butadiene rubber (HNBR), and/or at least one reinforcing filler such as Portland cement, aluminous cement, fly ash, slag cement, MgO, ZnO, $Ca(OH)_2$, $ZnCl_2$, $MgCl_2$, $CaCl_2$, $CaCO_3$, $Na_2CO_3$, and $K_2CO_3$.

Figure 5:
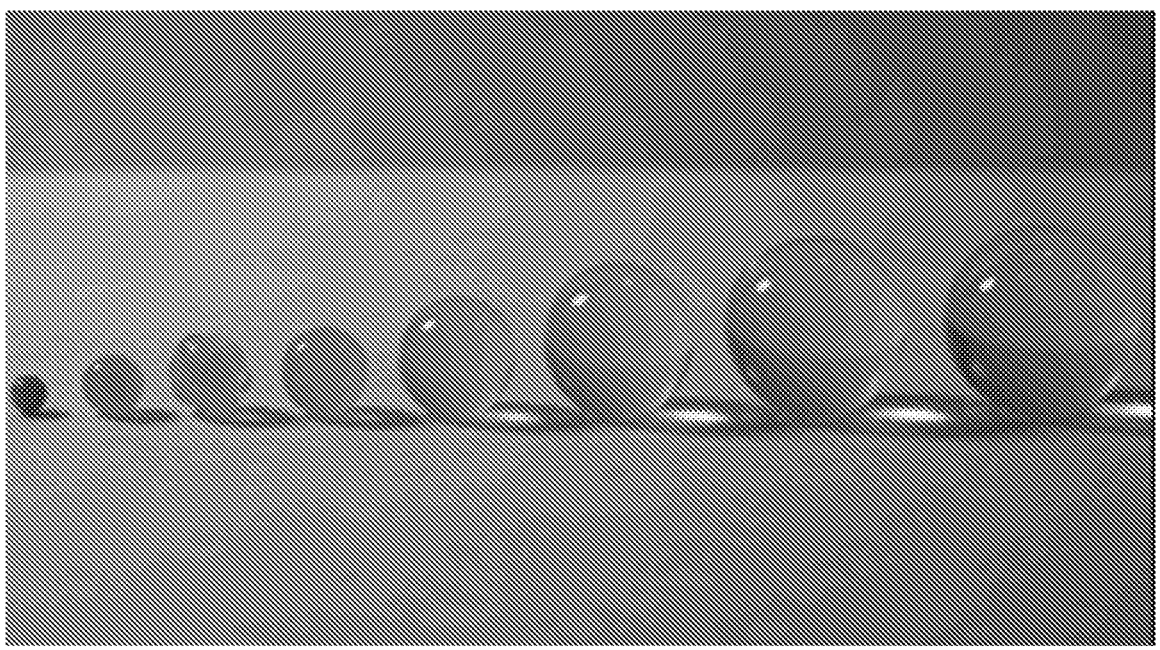
FIG. 5 shows an example of superabsorbent polymers according to one or more embodiments of the present disclosure.

Regarding swellable smart fillers, this filler/polymer can increase in volume when deployed into well fluid or brine. SAP, as shown in FIG. 5 for example, is a type of hydrophilic polymer (cross-linked hydrogel) having water-absorbing capacity from 100 g/g up to 2000 g/g, in which the absorbed water is scarcely removable even under pressure because the water molecules are held tightly in the network by hydrogen bonding. Using a cross-linked polymer like SAP will facilitate the passage of water through the three-dimensional network of the structure, while retaining the polymer structure, which can force the structure to swell.

The SAPs that may be used in accordance with one or more embodiments of the present disclosure include cross-linked forms of polyacrylate (acrylic acid and acrylamide), polyvinyl alcohol, poly(ethylene oxide), starch-acrylate copolymer, carboxymethyl cellulose, and other hydrophilic swellable polymers. As understood by those having skill in the art, the degree of swelling and the swelling rate of SAPs depend on the type of cross-linked polymer, the conditions of the water with respect to pH, salinity, temperature, and pressure, the duration of immersion in a solution, and the design of the samples.

Figure 6A:
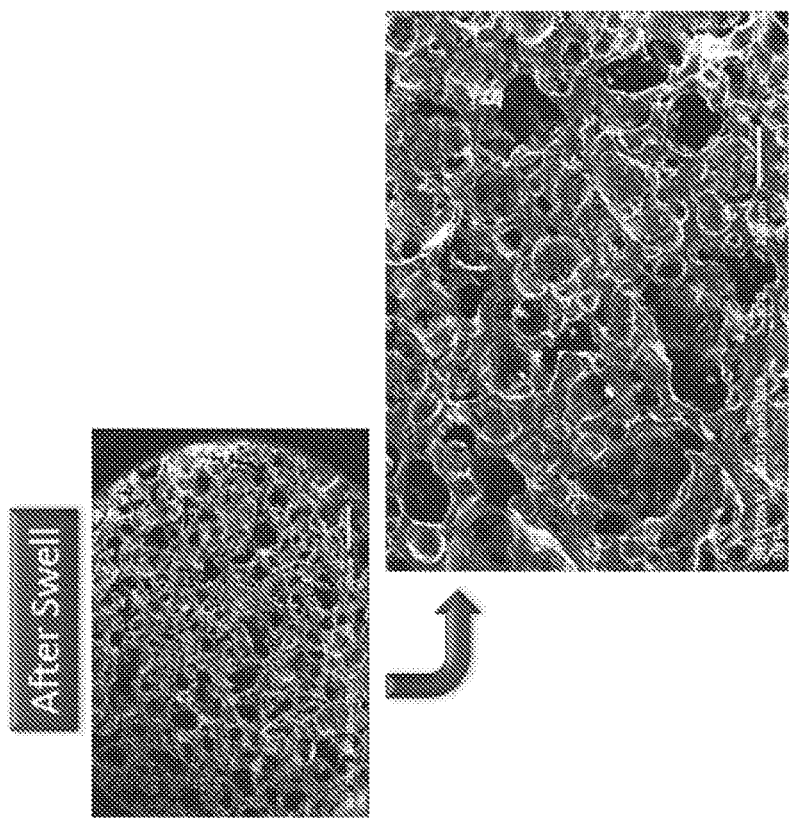
FIGS. 6(A) and 6(B) provide an example of elastomer foam morphology before and after brine swell.
Figure 6B:
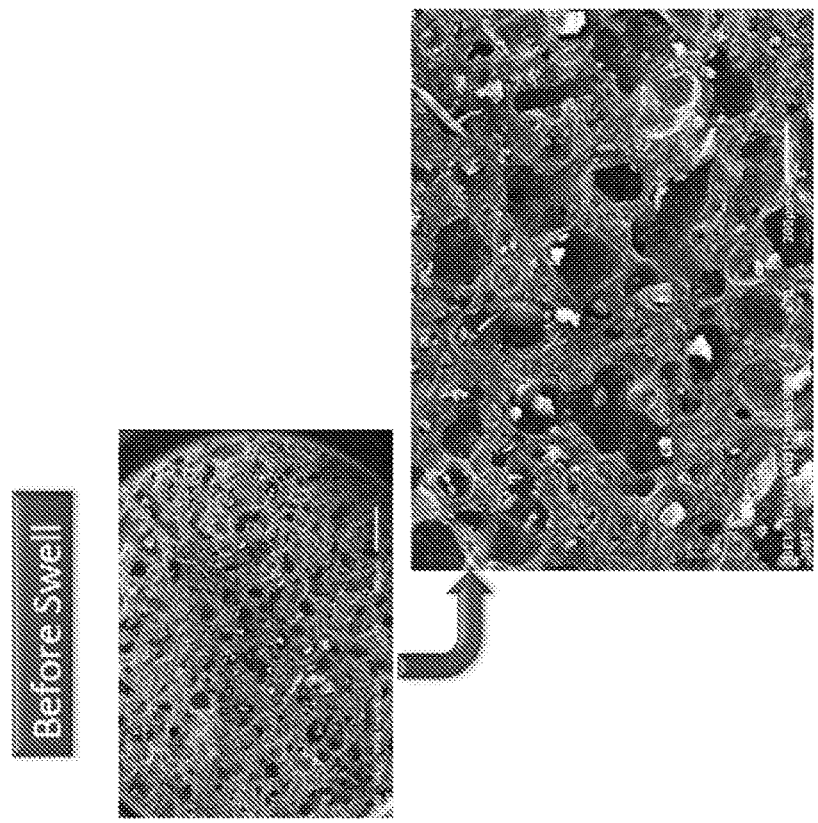

Referring now to FIGS. 6(A) and 6(B), an example of elastomer foam morphology before and after brine swell is provided. In the example shown in FIGS. 6(A) and 6(B), the elastomer foam includes smart fillers, such as those previously described, to facilitate swelling in brine. The elastomer foam itself may also swell in the presence of brine, independent of any swelling contributed by the smart fillers. As shown in FIGS. 6(A) and 6(B), the morphology of the elastomer foam is relatively constant before and after swelling in brine. Such consistent morphology before and after swelling suggests that the elastomer foam is a viable filter medium with advantageous permeability properties.

In addition to smart fillers, the non-metallic compliant material for the compliant screen may also include other "non-smart" fillers such as talc, mica, silica, carbon black, nanographene, carbon nanotubes, glass fibers, and carbon fillers for additional support.

The fillers according to one or more embodiments of the present disclosure may be surface treated to improve the bonding with the polymeric matrix of the non-metallic compliant material. Self-reinforcing fillers such as cement may react with completion brine or water to improve strength of the non-metallic compliant material.

According to one or more embodiments of the present disclosure, the screen may include a mechanical retainer that compresses the non-metallic compliant material in a compressed state. When the non-metallic compliant material is deployed downhole in the compressed state due to compression by the mechanical retainer, a wellbore condition downhole such as a temperature change or a lapse in time, for example, may cause the mechanical retainer to release from the non-metallic compliant material. Release of the mechanical retainer will allow the non-metallic compliant material to transition from the compressed state to an expanded state. In the expanded state, the non-metallic compliant material can expand to a larger shape as the smart fillers dispersed within a polymer matrix of the non-metallic compliant material react with downhole fluids to increase in size. In one or more embodiments, the mechanical retainer may be a degradable polymeric wrapping tape that dissolves in water or other downhole fluids when exposed to the wellbore condition. The mechanical retainer may also be thermally molded to the non-metallic compliant material.

Figure 7A:
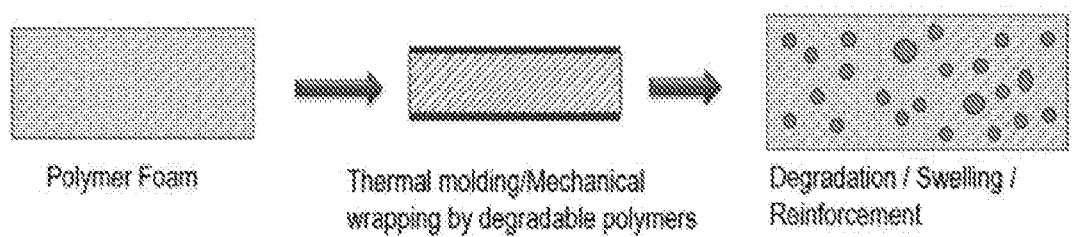
FIGS. 7(A) and 7(B) show an example of mechanical compress and release according to one or more embodiments of the present disclosure.
Figure 7B:
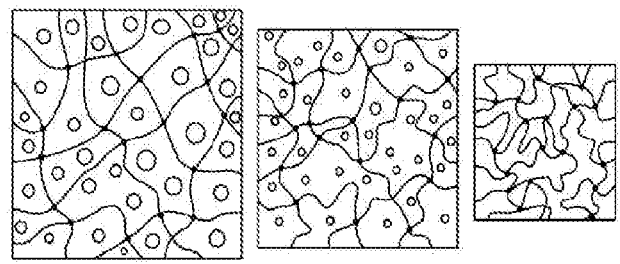

Referring now to FIGS. 7(A) and 7(B), an example of mechanical compress and release according to one or more embodiments of the present disclosure is shown. As shown, the polymer foam or non-metallic compliant material is thermally molded and/or mechanically wrapped by degradable polymers, which compresses the polymer foam. After exposure to a wellbore condition, the degradable polymers may degrade or otherwise release from the polymer foam or non-metallic compliant material, allowing the polymer foam or non-metallic compliant material to transition from the compressed state to the expanded state. In the expanded state, the smart fillers, which may include swellable fillers and/or reinforcing fillers, react with the base polymer of the polymer foam or non-metallic compliant material. In this way, the non-metallic compliant material can expand to a larger shape as the smart fillers dispersed within the polymer matrix of the non-metallic compliant material react with downhole fluids to increase in size. In addition, the smart fillers may also increase the stiffness of the polymer matrix, thereby strengthening the non-metallic compliant material to better withstand downhole pressures. Moreover, the non-metallic compliant material can expand to conform to an irregular shape of the wellbore, as shown in FIG. 2(B) as previously described, for example. Due to the smart fillers, the non-metallic compliant material experiences improved and sustained strength while in the expanded state. The non-metallic compliant material also experiences a modulus increase from the compressed state to the expanded state. In view of the above disclosure, FIGS. 7(A) and 7(B) show the progression of the polymer foam or non-metallic compliant material from the compressed state to the expanded state according to one or more embodiments of the present disclosure.

Figure 7C:
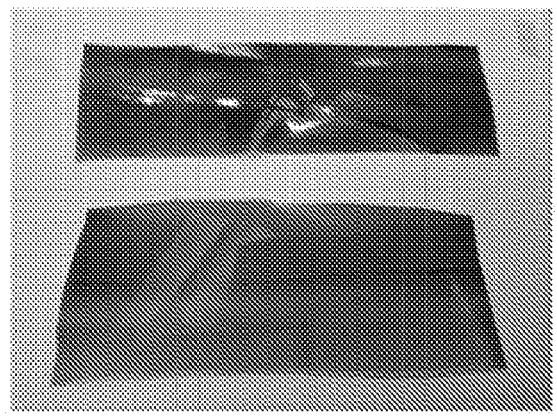
FIG. 7(C) shows a photograph of different degradable layers, which may be used as a mechanical retainer, according to one or more embodiments of the present disclosure.
Figure 7D:
FIG. 7(D) shows a photograph of different degradable layers after 48 hrs in KCl 3% brine at different temperatures.
Figure 7E:
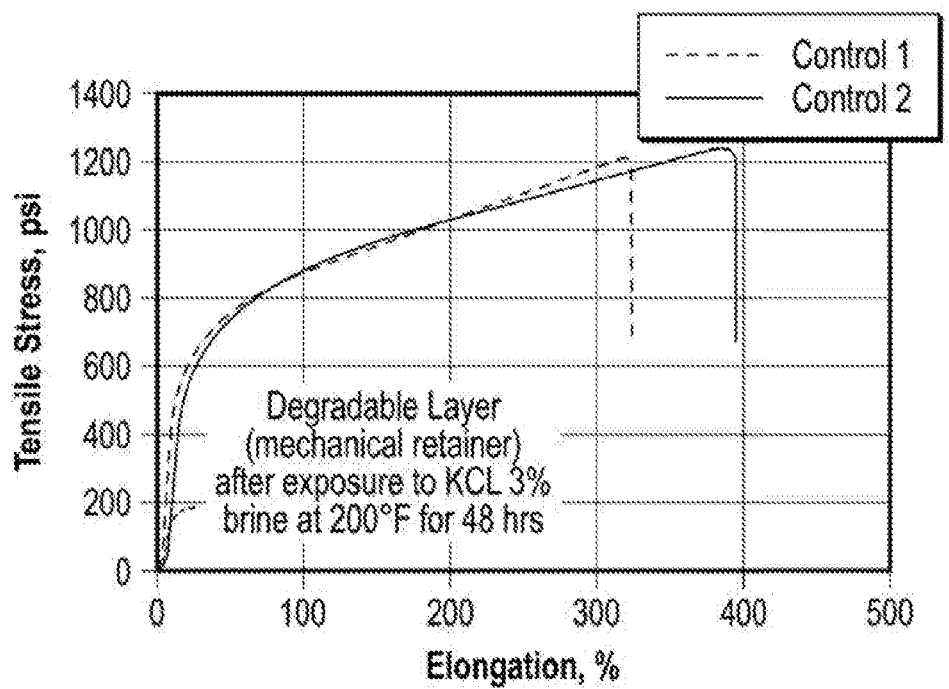
FIG. 7(E) shows tensile properties of a degradable layer (mechanical retainer) after 48 hrs in KCl 3% brine at 200° F. according to one or more embodiments of the present disclosure.

Referring now to FIG. 7(C), a photograph of different degradable layers, which may be used as a mechanical retainer, according to one or more embodiments of the present disclosure is shown. As shown, the degradable layers may be sufficiently thin to resemble and behave like a degradable film. FIG. 7(D) shows a photograph of different degradable layers after 48 hrs in KCl 3% brine at different temperatures. As shown in FIG. 7(D), the degradation rate of the different degradable layers increases with increased temperature. As such, the degradation rate of the degradable layers according to one or more embodiments of the present disclosure may be controlled via temperature. Referring now to FIG. 7(E), the tensile properties of a degradable layer (mechanical retainer) after 48 hrs in KCl 3% brine at 200° F. according to one or more embodiments of the present disclosure is shown. As shown, the degradable layer, which may be a mechanical retainer according to one or more embodiments of the present disclosure, degrades, dissolves, and otherwise exhibits low mechanical properties (i.e., about 200 psi tensile stress and about 20% to 25% elongation after 48 hrs in KCl 3% brine at 200° F.) as compared against the controls, which show about 1200 psi tensile stress and exhibit an elongation percentage in a range of 300% to 400%. Indeed, as shown, the degradable layer according to one or more embodiments of the present disclosure exhibits excellent degradability as compared against the controls.

Figure 8:
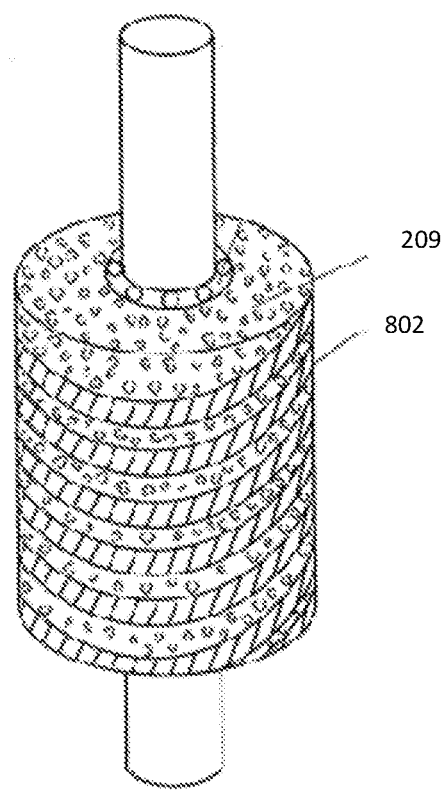
FIG. 8 shows an example of how a mechanical retainer (i.e., degradable layer or film) may be used according to one or more embodiments of the present disclosure.

Referring now to FIG. 8, an example of how a mechanical retainer may be used according to one or more embodiments of the present disclosure is shown. By using a chemical foaming process such as that described with respect to FIG. 3, for example, polymeric materials may be transformed into cellular structures. These cellular structure materials may be compressed into a smaller cylinder shape by using a mechanical degradable polymer tape wrapping process, as shown in FIG. 8, for example. As shown in FIG. 8, the mechanical retainer 802, which may be a degradable polymeric wrapping tape as previously described, may be mechanically wrapped around the cellular structures or non-metallic compliant material 209, thereby compressing the non-metallic compliant material 209 before deployment in the wellbore. In one or more embodiments, commercially available water-soluble tape may be used for the mechanical retainer 802, for example.

Figure 9:
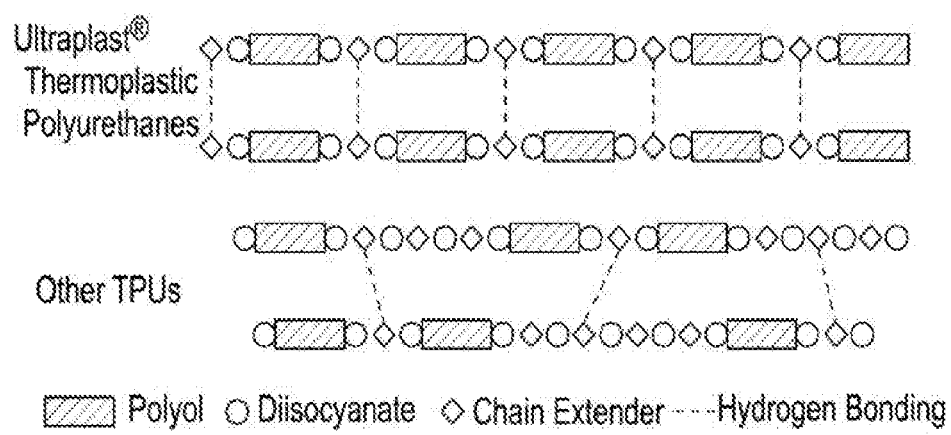
FIG. 9 shows an example of TPU chemical structures according to one or more embodiments of the present disclosure.

Various examples of the non-metallic compliant material according to one or more embodiments of the present disclosure will now be described. FIG. 9 provides examples of thermoplastic urethane (TPU) chemical structures according to one or more embodiments of the present disclosure. For example, in the previously described chemical foaming process with reference to FIG. 3, a polymer foam may be manufactured using TPU (such as one of the chemical structures shown in FIG. 9) compounded with smart fillers, which may include swellable or reinforcing fillers for the polymer material, and a chemical foaming agent as previously described. The resulting TPU polymer foam may be an open cell foam, and may be used as the non-metallic compliant material for the sand screen apparatus according to one or more embodiments of the present disclosure.

Figure 10:
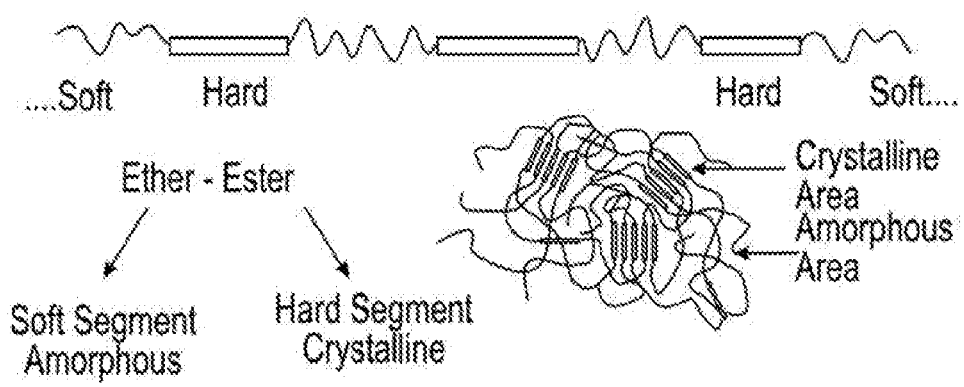
FIG. 10 shows an example of a chemical structure of an ether-ester thermoplastic elastomer according to one or more embodiments of the present disclosure.

FIG. 10 provides another example of a chemical structure of a base polymer that may be used in the non-metallic compliant material according to one or more embodiments of the present disclosure. Specifically, FIG. 10 shows a block copolymer of a thermoplastic polyester elastomer (TPE). For example, in the previously described chemical foaming process with reference to FIG. 3, a polymer foam may be manufactured using TPE (such as the block copolymer shown in FIG. 10) compounded with smart fillers, which may include swellable or reinforcing fillers for the polymer material, and a chemical foaming agent as previously described. The resulting TPE polymer foam may be used as the non-metallic compliant material for the sand screen apparatus according to one or more embodiments of the present disclosure, which may be mechanically compressed using degradable polymers before deployment downhole as previously described. In a downhole operation, mechanical release of the degradable polymers and reaction of the smart fillers with the TPE base polymer facilitate expansion of the non-metallic compliant material in accordance with one or more embodiments of the present disclosure, as previously described. According to one or more embodiments of the present disclosure, commercially available Hytrel® may be used as the TPE base polymer of the non-metallic compliant material.

Figure 11:
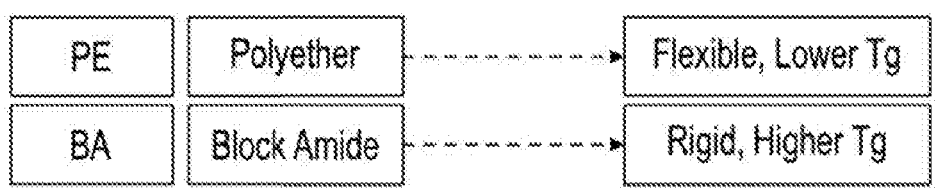
FIG. 11 shows a schematic drawing of a polyamide-polyether thermoplastic elastomer structure according to one or more embodiments of the present disclosure.
Figure 11:
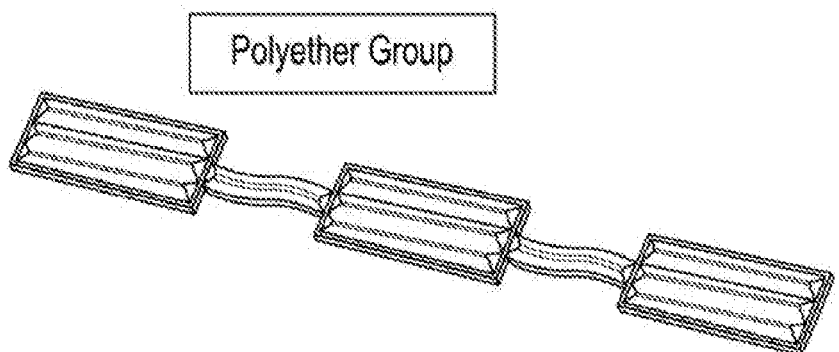

FIG. 11 provides another example of a chemical structure of a base polymer that may be used in the non-metallic compliant material according to one or more embodiments of the present disclosure. Specifically, FIG. 11 shows a polyamide-polyether (PA-PE) thermoplastic elastomer as the chemical structure. For example, in the previously described chemical foaming process with reference to FIG. 3, a polymer foam may be manufactured using TPE, PA-PE (such as the polymers shown in FIG. 11) compounded with smart fillers, which may include swellable or reinforcing fillers for the polymer material, and a chemical foaming agent as previously described. The resulting TPE, PA-PE polymer foam may be used as the non-metallic compliant material for the sand screen apparatus according to one or more embodiments of the present disclosure, which may be mechanically compressed using degradable polymers before deployment downhole as previously described. In a downhole operation, mechanical release of the degradable polymers and reaction of the smart fillers with the TPE, PA-PE base polymer facilitate expansion of the non-metallic compliant material in accordance with one or more embodiments of the present disclosure, as previously described.

Figure 12:
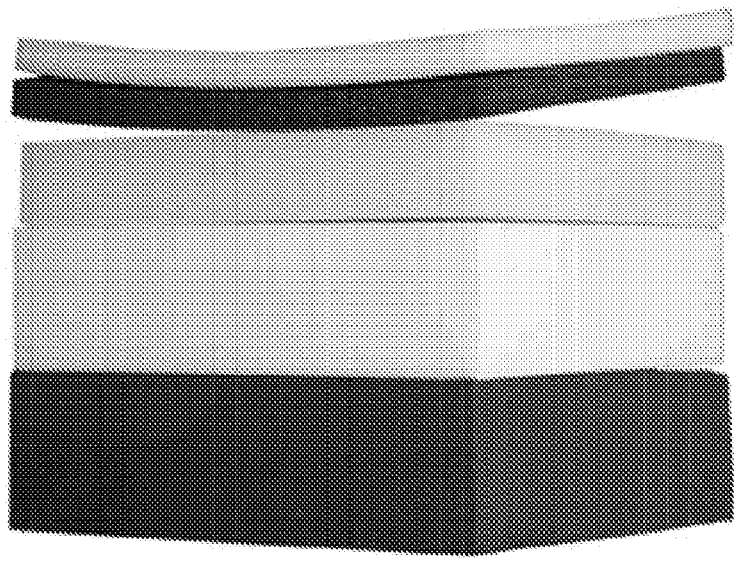
FIG. 12 shows an example of a cross-linked polyethylene (XLPE) foam according to one or more embodiments of the present disclosure.

FIG. 12 provides another example of a base polymer that may be used in the non-metallic compliant material according to one or more embodiments of the present disclosure. For example, FIG. 12 shows an example of a polyolefin, which may be a cross-linked polyethylene (XLPE) foam, according to one or more embodiments of the present disclosure. Advantageously, cross-linking polyethylene can significantly improve the low-temperature impact strength, the abrasion resistance, and the environmental stress cracking resistance of the chemical structure. However, cross-linking polyethylene may reduce the hardness and rigidity of the chemical structure to a degree. Because XLPE is similar to elastomers, XLPE does not melt and is thermally resistant. Further, the maximum shear modulus of the chemical structure increases with increasing cross-linking density (even at higher temperatures). Indeed, XLPE has significantly enhanced properties compared to ordinary polyethylene. For example, the cross-linking in XLPE enhances the temperature properties in the base polymer. Adequate strength to 120-150° C. is maintained, and chemical stability is enhanced by resisting dissolution. Low-temperature properties are improved. Impact and tensile strength, scratch resistance, and resistance to brittle fracture are enhanced.

Figure 13A:
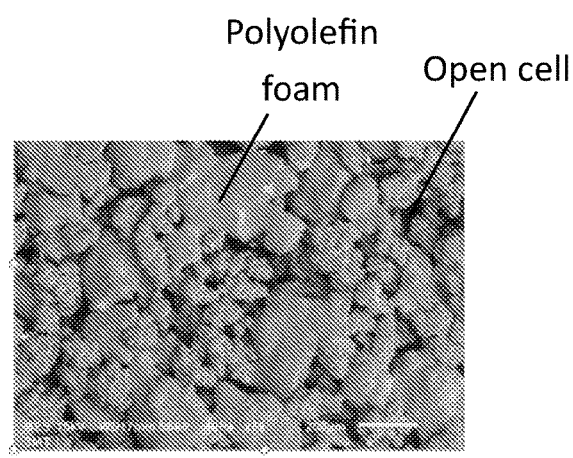
FIGS. 13(A) and 13(B) show a polyolefin foam morphology at 200 µm resolution and 100 µm resolution, respectively.
Figure 13B:
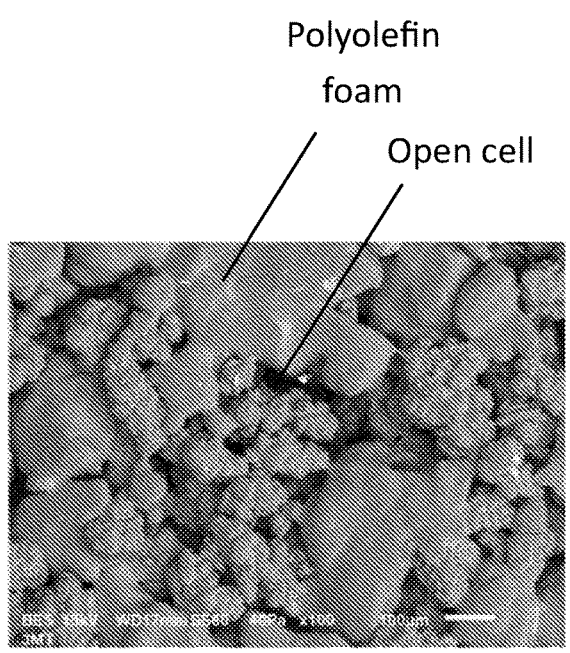

According to one or more embodiments of the present disclosure, the XLPE foam shown in FIG. 12 may be an open cell foam, which may be manufactured by using various chemical foaming agents during a molding process, as previously described. For example, in the previously described chemical foaming process with reference to FIG. 3, an open cell foam may be manufactured using XLPE compounded with smart fillers, which may include swellable or reinforcing fillers for the polymer material, and a chemical foaming agent as previously described. The resulting XLPE open cell foam may be used as the non-metallic compliant material for the sand screen apparatus according to one or more embodiments of the present disclosure, which may be mechanically compressed using degradable polymers before deployment downhole as previously described. For example, FIGS. 13(A) and 13(B) show a polyolefin foam morphology at 200 μm resolution and 100 μm resolution, respectively. As shown in FIGS. 13(A) and 13(B), the polyolefin foam morphology includes an open cell structure. In a downhole operation, mechanical release of the degradable polymers and reaction of the smart fillers with the XLPE base polymer facilitate expansion of the non-metallic compliant material in accordance with one or more embodiments of the present disclosure, as previously described.

FIGS. 14 and 15 provide another example of a base polymer that may be used in the non-metallic compliant material according to one or more embodiments of the present disclosure. For example, FIG. 14 shows an example of a silicone foam process, and FIG. 15 shows examples of silicone foam. As shown in FIG. 14, mixing the constituent components of silicone foam together causes hydrogen gas to form. The hydrogen gas causes the material to expand into a foam. In one or more embodiments, the foam may be cured to improve its strength and ease of handling.

According to one or more embodiments of the present disclosure, the silicone foam shown in FIGS. 14 and 15 may be an open cell foam, which may be manufactured by using various chemical foaming agents during a molding process, as previously described. For example, in the previously described chemical foaming process with reference to FIG. 3, an open cell foam may be manufactured using silicone foam compounded with smart fillers, which may include swellable or reinforcing fillers for the polymer material, and a chemical foaming agent as previously described. The resulting silicone open cell foam may be used as the non-metallic compliant material for the sand screen apparatus according to one or more embodiments of the present disclosure, which may be mechanically compressed using degradable polymers before deployment downhole as previously described. In a downhole operation, mechanical release of the degradable polymers and reaction of the smart fillers with the silicone foam base polymer facilitate expansion of the non-metallic compliant material in accordance with one or more embodiments of the present disclosure, as previously described.

FIG. 16 provides another example of a base polymer that may be used in a non-metallic compliant material according to one or more embodiments of the present disclosure. For example, FIG. 16 shows an example of an epoxy foam. According to one or more embodiments of the present disclosure, the epoxy foam shown in FIG. 16 may be an open cell foam, which may be manufactured by using various chemical foaming agents during a molding process, as previously described. For example, in the previously described chemical foaming process with reference to FIG. 3, an open cell foam may be manufactured using epoxy foam compounded with smart fillers, which may include swellable or reinforcing fillers for the polymer material, and a chemical foaming agent as previously described. FIGS. 17(A) and 17(B) show an epoxy foam morphology at 500 μm resolution and 200 μm resolution, respectively. As shown in FIGS. 17(A) and 17(B), the epoxy foam morphology includes an open cell structure. The resulting epoxy open cell foam may be used as the non-metallic compliant material for the sand screen apparatus according to one or more embodiments of the present disclosure, which may be mechanically compressed using degradable polymers before deployment downhole as previously described. In a downhole operation, mechanical release of the degradable polymers and reaction of the smart fillers with the epoxy foam base polymer facilitate expansion of the non-metallic compliant material in accordance with one or more embodiments of the present disclosure, as previously described.

Figure 18:
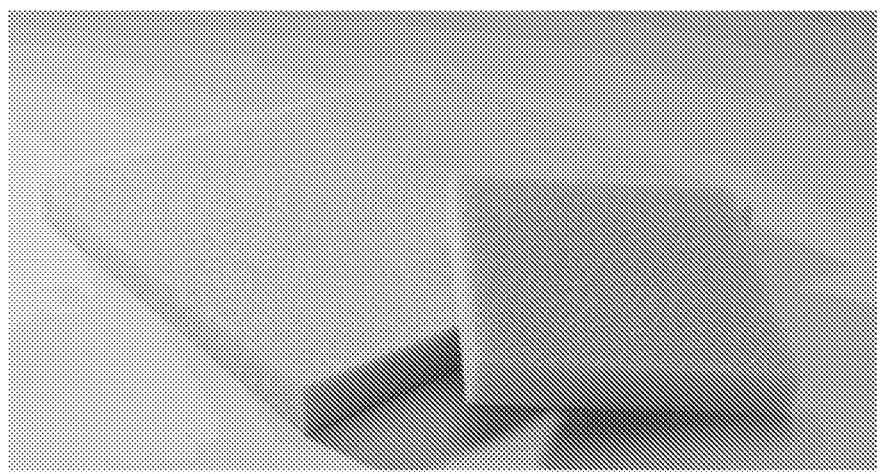
FIG. 18 is an example of a polyimide open cell foam according to one or more embodiments of the present disclosure.

FIG. 18 provides another example of a base polymer that may be used in a non-metallic compliant material according to one or more embodiments of the present disclosure. For example, FIG. 18 shows an example of a polyimide open cell foam. According to one or more embodiments of the present disclosure, the polyimide open cell foam shown in FIG. 18 may be manufactured by using various chemical foaming agents during a molding process, as previously described. For example, in the previously described chemical foaming process with reference to FIG. 3, an open cell foam may be manufactured using polyimide compounded with (or without) smart fillers, which may include swellable or reinforcing fillers for the polymer material, and a chemical foaming agent as previously described. The resulting polyimide open cell foam may be used as the non-metallic compliant material for the sand screen apparatus according to one or more embodiments the present disclosure, which may be mechanically compressed using degradable polymers before deployment downhole as previously described. In a downhole operation, mechanical release of the degradable polymers and reaction of the smart fillers with the polyimide base polymer facilitate expansion of the non-metallic compliant material in accordance with one or more embodiments of the present disclosure, as previously described.

The polyimide open cell foam of FIG. 18, which may be used as the non-metallic compliant material for the sand screen apparatus according to one or more embodiments the present disclosure, can withstand high temperature applications up to 300° C. Further, the polyimide open cell foam is flexible and recovers sufficiently after mechanical compression by the degradable polymers has been released. Moreover, the formulation of the polyimide open cell foam may be customized with smart fillers in order to enhance compliance and reinforcement.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A sand screen apparatus for use in a downhole operation for hydrocarbon recovery, comprising:
    a non-metallic material having a compressed state and an expanded state, the non-metallic material comprising:
        a base polymer; and
        a plurality of smart fillers dispersed within a polymeric matrix of the non-metallic material, wherein a first smart filler of the plurality of smart fillers is configured to facilitate swelling of the non-metallic material in response to a wellbore condition, and wherein a second smart filler of the plurality of smart fillers is configured to facilitate stiffening of the non-metallic material in response to the wellbore condition; and
    a mechanical retainer that compresses the non-metallic material in the compressed state.

2. The apparatus of claim 1, wherein the non-metallic material comprises a foam structure.

3. The apparatus of claim 1, wherein the non-metallic material comprises an open cell foam.

4. The apparatus of claim 1, wherein the mechanical retainer is a degradable polymeric wrapping tape.

5. The apparatus of claim 4, wherein the wellbore condition causes the degradable polymeric wrapping tape to dissolve.

6. The apparatus of claim 1, wherein the wellbore condition causes the mechanical retainer to release from the non-metallic material.

7. The apparatus of claim 6, wherein the non-metallic material conforms to a wellbore in the expanded state.

8. The apparatus of claim 1, wherein the base polymer comprises:
    polyurethane;
    thermoplastic polyurethane;
    thermoplastic elastomer;
    poly ether-ester block copolymer;
    polyamide polyether thermoplastic elastomer;
    polyolefin;
    cross-linked polyethylene;
    silicone rubber;
    nitrile butadiene rubber (NBR);
    hydrogenated nitrile butadiene rubber (HNBR);
    ethylene propylene diene monomer rubber (EPDM);
    fluoroelastomer;
    epoxy;
    polyimide; or
    any combination thereof.

9. The apparatus of claim 1, wherein the one or the plurality of smart fillers comprises:
    superabsorbent polymer;
    ethylene propylene diene monomer rubber (EPDM);
    hydrogenated nitrile butadiene rubber (HNBR);
    Portland cement;
    aluminous cement;
    fly ash, slag cement;
    MgO;
    ZnO;
    $Ca(OH)_2$;
    $ZnCl_2$;
    $MgCl_2$;
    $CaCl_2$;
    $CaCO_3$;
    $Na_2CO_3$;
    $K_2CO_3$; or
    any combination thereof.

10. The apparatus of claim 1, wherein the non-metallic material experiences a modulus increase from the compressed state to the expanded state.

11. The apparatus of claim 1, wherein the first smart filler is configured to undergo a first chemical reaction in response to the wellbore condition to facilitate the swelling.

12. The apparatus of claim 11, wherein the second smart filler is configured to undergo a second chemical reaction in response to the wellbore condition to facilitate to the stiffening.

13. The apparatus of claim 1, wherein:
    the base polymer comprises:
        polyurethane;
        thermoplastic polyurethane;
        a thermoplastic elastomer;
        a poly ether-ester block copolymer;
        a polyamide polyether thermoplastic elastomer;
        polyolefin;
        cross-linked polyethylene;
        silicone rubber;
        nitrile butadiene rubber (NBR);
        hydrogenated nitrile butadiene rubber (HNBR);
        ethylene propylene diene monomer rubber (EPDM);
        a fluoroelastomer;
        epoxy;
        polyimide; or
        any combination thereof;
    the first smart filler comprises:
        a superabsorbent polymer (SAP);
        ethylene propylene diene monomer rubber (EPDM);
        hydrogenated nitrile butadiene rubber (HNBR); or
        any combination thereof; and
    the second smart filler comprises:
        Portland cement;
        aluminous cement;
        fly ash, slag cement;
        MgO;
        ZnO;
        $Ca(OH)_2$;
        $ZnCl_2$;
        $MgCl_2$;
        $CaCl_2$);

CaCO$_3$;
Na$_2$CO$_3$;
K$_2$CO$_3$; or
any combination thereof.

14. A well completion method, comprising:
covering at least one base pipe with a non-metallic material, the non-metallic material comprising:
a base polymer; and
a plurality of smart fillers, wherein a first smart filler of the plurality of smart fillers is configured to facilitate swelling of the non-metallic material in response to a wellbore condition, and wherein a second smart filler of the plurality of smart fillers is configured to facilitate stiffening of the non-metallic material in response to the wellbore condition;
compressing the non-metallic material with a mechanical retainer;
running the base pipe to a location in a wellbore;
expanding the non-metallic material;
conforming the non-metallic material to a wall of the wellbore;
stiffening the non-metallic material;
filtering fluids through the non-metallic material to the base pipe;
detaching the non-metallic material from the base pipe; and
lifting the base pipe out of the wellbore.

15. The method of claim 14, wherein the mechanical retainer is a degradable polymeric wrapping tape.

16. The method of claim 15, wherein the expanding step comprises dissolving degradable polymeric wrapping tape.

17. The method of claim 14, wherein the expanding step comprises releasing the mechanical retainer.

18. A method of completing a wellbore in a subterranean formation, comprising:
positioning an expandable sand control apparatus in the wellbore such that an annulus is formed between the expandable sand control apparatus and the wellbore, the expandable sand control apparatus comprising a non-metallic material having an open cell structure, the non-metallic material comprising:
a base polymer; and
a plurality of smart fillers, wherein a first smart filler of the plurality of smart fillers is configured to facilitate expansion of the non-metallic material to fill the annulus in response to a wellbore condition of the wellbore, and wherein a second smart filler of the plurality of smart fillers is configured to facilitate stiffening of the non-metallic material in response to the wellbore condition.

19. The method of claim 18, further comprising compressing the expandable sand control apparatus with a mechanical retainer before the positioning step.

20. The method of claim 19, wherein the mechanical retainer is a degradable polymeric wrapping tape.

* * * * *